United States Patent [19]

Högberg et al.

[11] 4,116,249
[45] Sep. 26, 1978

[54] APPARATUS FOR CUTTING, FELLING, AND DEBRANCHING TREES

[75] Inventors: Lars Gunnar Högberg; Bo Gunnar Ekeborg, both of Bonassund, Sweden

[73] Assignee: Mo och Domsjo Aktiebolag, Ornskoldsvik, Sweden

[21] Appl. No.: 776,385

[22] Filed: Mar. 10, 1977

[30] Foreign Application Priority Data

Mar. 15, 1976 [SE] Sweden ............................... 7603282

[51] Int. Cl.² ............................................. A01G 23/08
[52] U.S. Cl. .................................. 144/3 D; 144/2 Z; 144/34 R
[58] Field of Search ................... 144/2 Z, 3 D, 34 R, 144/34 E, 309 AC; 83/928

[56] References Cited

U.S. PATENT DOCUMENTS

| 3,595,288 | 7/1971 | Landers | 144/2 Z X |
|---|---|---|---|
| 3,823,753 | 7/1974 | Moser | 144/3 D |
| 3,991,799 | 11/1976 | Albright | 144/3 D |
| 3,999,582 | 12/1976 | Allen et al. | 144/3 D |
| 4,004,622 | 1/1977 | Hamilton | 144/3 D |

Primary Examiner—Frank T. Yost
Assistant Examiner—W. D. Bray

[57] ABSTRACT

An apparatus for cutting, felling, and debranching trees is provided, having a felling head carried on a mobile crane, the felling head including (i) a device for grasping and holding a tree; (ii) a device for cutting and felling a tree; and (iii) a device for debranching a tree, the felling head being pivotable between a position in which the tree can be cut and felled, and a position in which the felled tree can be debranched; since the tree holding, tree cutting and felling, and tree debranching means are all operatively carried on a common support, the felling head, the size of the apparatus is reduced, conserving weight, with a resultant increased maneuverability.

14 Claims, 8 Drawing Figures

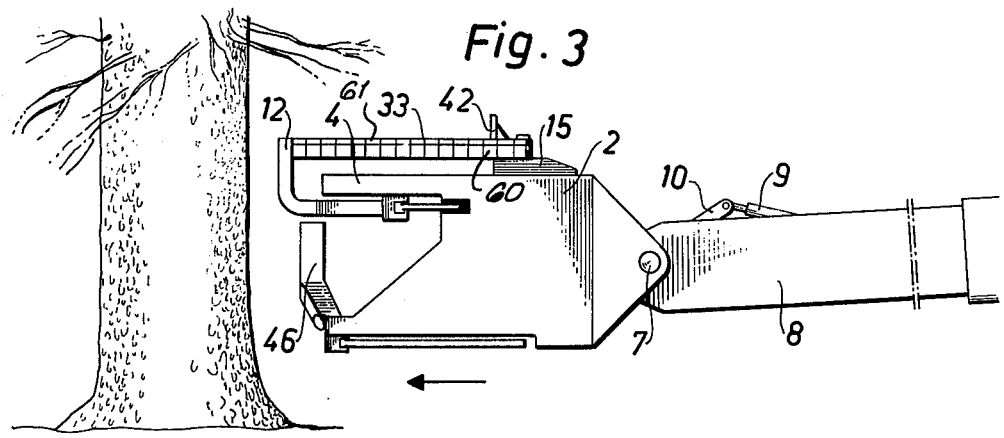
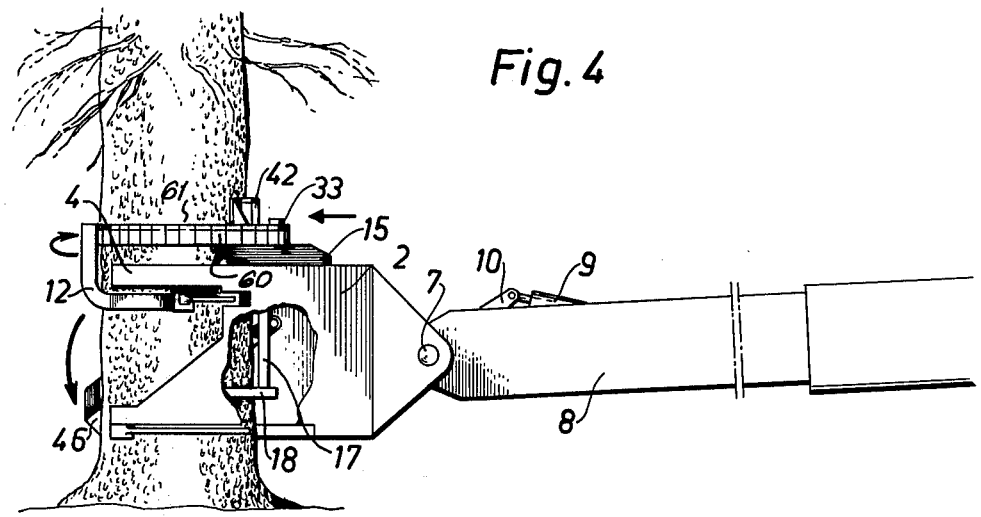
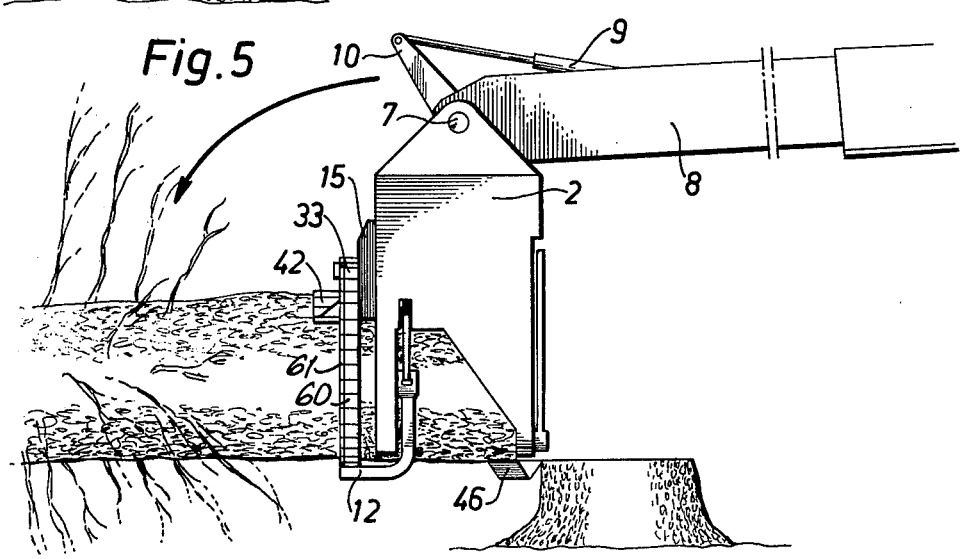

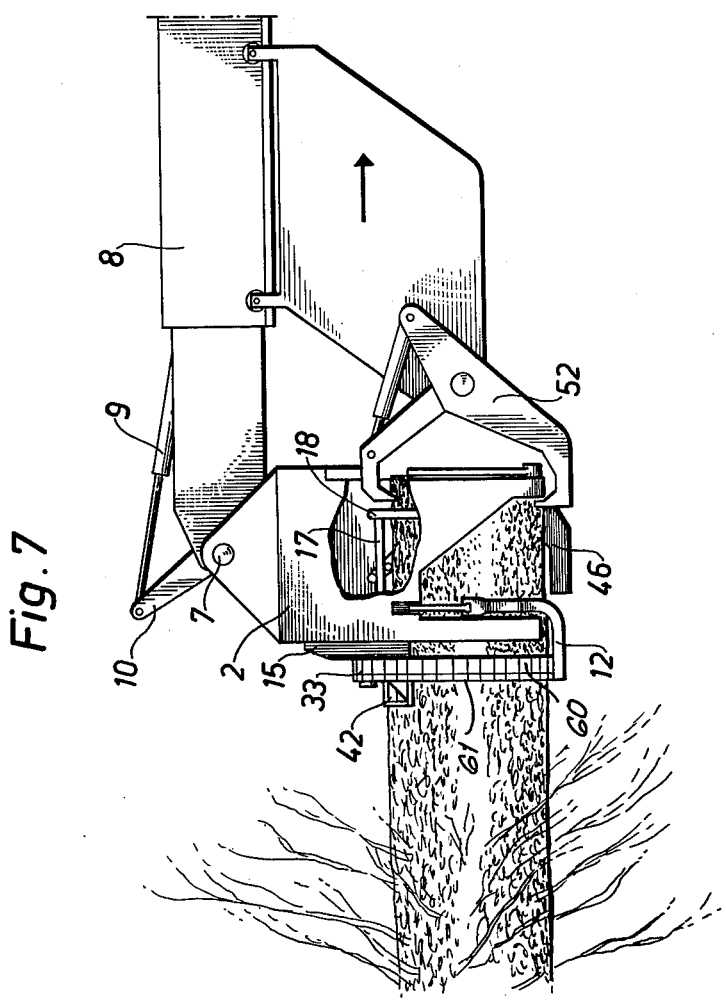
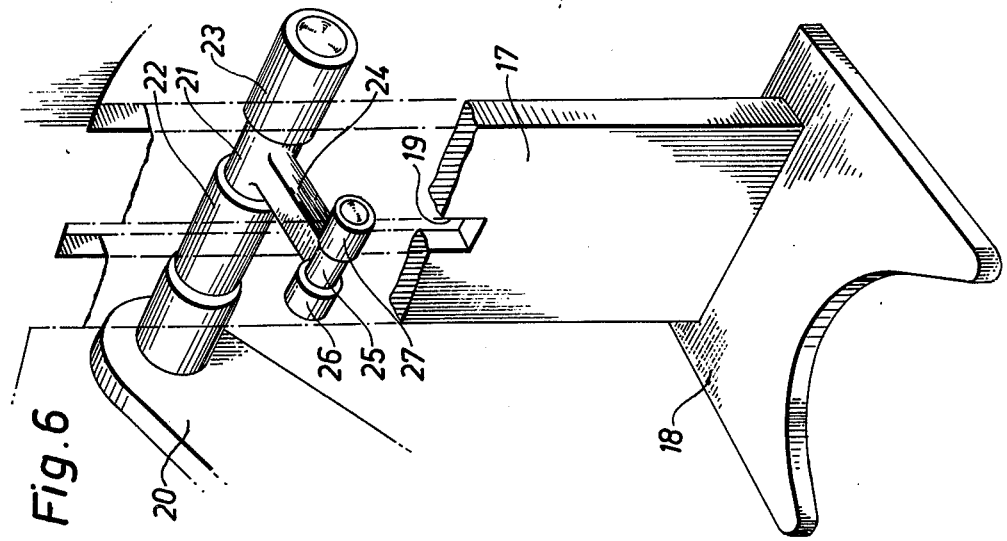

APPARATUS FOR CUTTING, FELLING, AND DEBRANCHING TREES

Tree cutting and felling devices normally include a felling head mounted on a mobile crane, which is carried on a vehicle. The felling head includes means for holding a tree, means for cutting and felling the tree, and means for debranching the tree after it has been felled. In such devices, the mechanism for holding, cutting and felling the tree and the mechanism for debranching the felled tree are normally constructed as independent units. This means that the crane must carry two relatively complicated and heavy units, which places an unnecessarily high load on the crane, and also reduces maneuverability. This load becomes a strain problem, particularly when the crane is fully extended, in which position the weight of the tree and the weight of the tree felling and debranching devices can impose a high torque on the crane, which can buckle or topple unless it is built of very heavy steel stock.

The holding means normally employed in such devices includes two gripping arms movable between closed and open positions, and which when gripping the tree in the closed position cross each other on the rear side of the tree. The length of these gripping arms, when opened, makes it difficult to maneuver the device in areas where trees grow closely together, so as to bring the arms into a position for gripping a tree.

When felling trees, it is normally easier not to saw the tree completely through, but to topple the tree, and permit the tree to break off from the remaining stub on the stump in the course of its fall. This technique reduces the force required to lift the tree upright to prevent saw from getting caught. However, when a tree is permitted to break off the stump, the trunk tends to split longitudinally at the break, because the holding means lies not against the unsawed portion of the trunk, but on the felling side of the tree, at a level above the cut. Such splits damage the tree precisely where it is the thickest and can affect the widest planks in converting it into lumber.

In accordance with the invention these difficulties are overcome:

(1) by combining the tree holding, cutting and felling means with the tree debranching means in one felling head, thereby combining these two devices into one;

(2) by holding the tree on all sides during the cutting and felling operation, and (3) by mounting the tree-holding means on a support arranged for reciprocable movement on the felling head, so that the holding means can be made relatively short.

A further feature of the apparatus of the invention is a tree-holding means that not only adapts itself substantially to the diameter and external configuration of the tree, but also holds the tree opposite the felling cut on the side of the tree opposite to the cutting means, in holding contact with the portion of the tree which is not sawed completely through. Thus the tree can be toppled against the holding means when sawed nearly through and the holding means can thereby serve as a fulcrum, effective to break the fall of the tree and inhibit longitudinal splitting of the trunk when the trunk breaks the stub attached to the stump.

The apparatus for cutting, felling, and debranching trees according to the invention comprises, in combination, a mobile crane; a felling head pivotably mounted on the mobile crane; the felling head comprising means for holding a tree, means for cutting and felling a tree, and means for debranching a tree; the felling head being pivotable between a first position in which the tree can be held by the holding means, and cut and felled by the cutting and felling means; and a second position in which the felled tree can be moved along its longitudinal axis past and debranched by the debranching means; the debranching means comprising first debranching means, second debranching means, and third debranching means; a reciprocable support carrying the first, second and third debranching means and the holding means towards and away from a tree trunk; the holding means comprising upper and lower holding elements, the upper holding element comprising a pair of pivotable gripping pincers, and the first and second debranching means, and the lower holding element comprising the reciprocable support and a gripping member pivotably mounted on the support for movement between tree holding and inactive positions; the first, second and third debranching means being resiliently mounted on the support between the holding means and the support; the holding means, debranching means and support means being coordinatedly and combinedly movable with respect to each other, so as to embrace a tree therebetween.

An important feature of the apparatus in accordance with the invention is the mounting of the three debranching means on a common reciprocable support in a manner to do double duty in combination with the support as a holding means and a debranching means. The capability of the common support to support both the holding means for the tree and the debranching means makes it possible to combine the debranching and cutting and felling functions into one felling head. This means that the felling head can be much lighter than usual, as a result of which the crane can be reduced in size, since it need not carry so heavy a load, and can be attached to the vehicle in a simple and straightforward manner.

The felling head is arranged for reciprocable movement towards and away from a tree trunk, and as a result the gripping pincers and gripping members of the holding means can be held vertically or horizontally when the felling head is being maneuvered into position to grasp a tree, and moved in horizontally to grasp the tree. In consequence, the gripping pincers and member can be made relatively short, and the apparatus is relatively easy to maneuver in thick woods, since it requires a smaller space to position the felling head against a tree.

The felling head carries a carriage that is also mounted for reciprocable movement with respect to the felling head. The carriage provides a recess for accommodating the trunk of a tree therewithin. The recess in combination with the holding means, i.e., the gripping pincers, gripping member, and the three debranching means, are adjustable to correspond with the diameter of the tree, for a sure and firm grip on the tree.

When the tree trunk is in the recess on the carriage, the gripping pincers and gripping member can be brought into contact with the tree on the side opposite to and above or at the level of the felling cut made by the cutting means, with the portion of the trunk which is not sawed completely through during the felling operation. In this way, the gripping member opposite the cut is in a position to break the fall of the tree as the tree stub breaks off from the stump, and thereby prevents splitting of the trunk during felling.

A preferred embodiment of the invention is illustrated in the drawings, in which:

FIG. 3 shows the felling head in a horizontal position, ready to embrace and hold a tree preparatory to cutting;

FIG. 4 shows the felling head in a horizontal embracing and holding position against a tree during the cutting;

FIG. 5 shows the felling head in a vertical position, for debranching the tree after it has been felled.

FIG. 6 is a detailed view of the carriage and particularly the carriage drive system of FIGS. 1 and 2, with parts cut away, for clarity of representation;

FIG. 7 shows the felling head in a vertical position during debranching of a felled tree.

In FIGS. 3, 4, 5 and 7, the mobile crane jib is shown in an extended position, and is mounted on a vehicle which is not shown.

Figure 1:
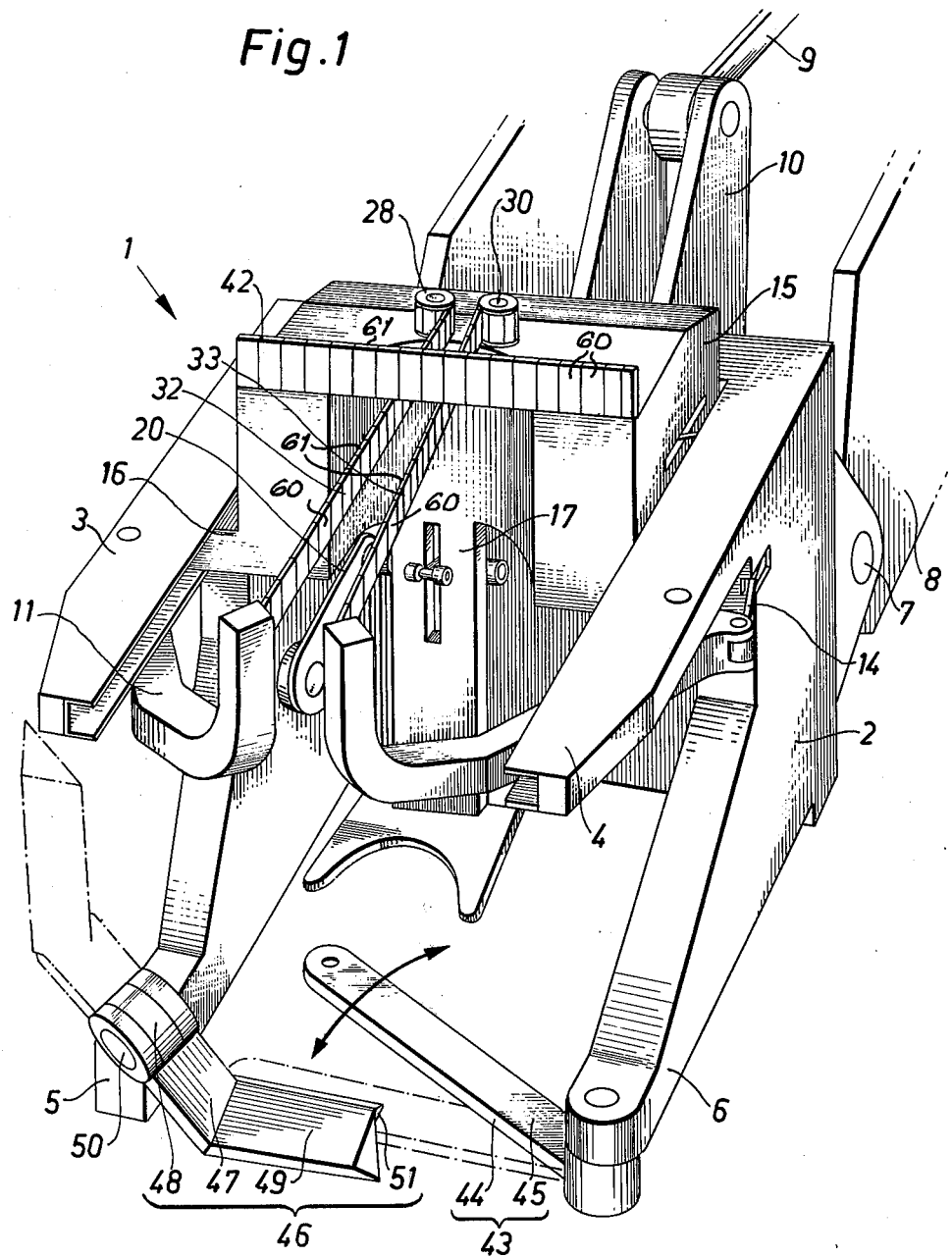
FIG. 1 is a front view of the apparatus, seen from the position of the tree about to be embraced and held thereby.

The apparatus shown in FIG. 1 has a felling head 1 in an open U-shape, with four beam supports 3, 4, 5 and 6 extending outwardly and in parallel from one side of the four corners of the base 2 of the frame. From the base 2 of the frame on the other side extend two outwardly projecting portions 7a, 7b serving as supports for a pivot shaft 7 journalled at the outer end 8a of a crane jib 8 which is reciprocably mounted on a vehicle which is not shown.

The manner in which the felling head 1 can pivot about the shaft 7 is shown in FIGS. 3 to 5 and 7, from which it is evident that the felling head can be pivoted to horizontal (FIGS. 3 and 4) and vertical (FIGS. 5 and 7) positions. A hydraulic cylinder 9 is mounted on the crane jib 8, the piston 9a of which is attached at boss 9b via pivot pin 10a to the arms 10, fixedly mounted to the frame 2. It is apparent from FIGS. 3 and 4 that when the piston 9a is withdrawn into the cylinder 9, the felling head is brought into the horizontal position, and from FIGS. 5 and 7 that when the piston 9a is extended outwardly from the cylinder 9, the felling head is brought into the vertical position. In the horizontal position, the felling head is in a position to cut and to fell the tree, and in the vertical position the felling head is in a position to debranch the tree, in a manner presently to be seen.

The two upper beams 3, 4 on frame 2 are channel-shaped, with the open sides of the channels 3a, 4a facing each other, at opposite sides of the frame. These channels 3a, 4a accordingly serve as tracks, for reciprocation of a carriage 15. A pair of gripping pincers or claws 11, 12, one component of the upper holding element, are pivotably mounted on the pivot shafts 11a, 12a, which extend through the beams 3, 4. Each claw has an outwardly turned tip end 11b, 12b. The other end 11c, 12c of the gripping claws is connected to hydraulic cylinders 13, 14, pivotably mounted (not shown) on the frame 2. Inward and outward movement of the pistons 13a, 14a of these hydraulic cylinders pivot the claws 11, 12 between open inactive (see FIG. 3) and closed gripping (see FIGS. 1 and 2) positions. When the claws are brought into the closed position, as required for gripping a tree, the turned ends 11b, 12b abut, preventing further movement of the claws toward each other.

The reciprocable carriage 15 is movable along the tracks 3a, 4a on slides 16 (of which only one is shown), which fit in the channels of the beams 3, 4. Reciprocating sliding movement of the carriage along the beams 3, 4 is obtained by the mechanism shown in detail in FIG. 6. The central portion of the carriage 15 has a semicircular recess 15a, from one end of which extends a support member 17 for the tree gripping plate 18. This plate is provided with a semicircular recess 18a, which is adapted to receive and engage the trunk of a tree as one component of the lower holding element, the other component of the lower holding element being the gripping element 46, which is arranged to grip the other side of the tree from the gripping plate 18. The gripping plate 18 is brought into and out from contact with the tree with reciprocating movement of the carriage 15.

The support 17 as best seen in FIG. 6 has an axial slot 19, through which extends an arm 24. The arm 24 carries at one end a long cylindrical pin 21, and at its other end on the other side of slot 19 cylindrical pin 25. Each pin 21, 25 has rotatably mounted thereon a number of rollers 22 and 23; 26 and 27, respectively, which according to the position of the arm 24 contact and roll along the surface of the support 17.

One end of the pin 21 is fixedly mounted on the arm 20, and the other end of the arm 20 is pivotably mounted via pivot pin 20a on the frame 2. The arm 20 is connected to a hydraulic cylinder (which is not shown) which pivots the arm 20 about the pivot pin 20a, moving the fixed pin 21 along slot 19 in a corresponding manner, and this results in reciprocating movement of the carriage 15 along the tracks 3a, 4a.

The carriage 15 also carries upper and lower sets of spools 28, 30 and 29, 31, respectively, with the roof 15b of the carriage 15 therebetween. First and second debranching chains to which are attached cutters, 32, 33 are attached at one end 32a, 33a to the ends 11b, 12b of gripping claws 11, 12, respectively, and at the other ends 32b, 33b are attached to and wound over the spools 28, 30, respectively. Draw lines 34, 35 are attached to the ends 32b, 33b, pass around spools 28, 30 and are then attached to and wound on the spools 29, 31, whence they extend over tension rollers 36, 37, 38, 39 to tension springs 40, 41, attached to the ends of the beams 3, 4 at lugs 40a, 41a. Accordingly, the debranching chains 32, 33 are tensioned and held taut between the claws 11, 12 and the spools 28, 30.

A third debranching flexible chain cutter, 42, is mounted on the throat of the support member 17 and across the carriage 15, extending transversely across the first and second debranching chains 32, 33. The three chains 32, 33 and 42 comprise the debranching means of the felling head. The debranching chains 32, 33, 42, together with the gripping claws 11, 12 encircle the tree trunk, and form the upper holding elements of the holding means. The gripping plate 18 and gripping element 46 constitute the lower holding elements of the holding means.

The debranching chains 32, 33, 42 have a belt-like appearance, and comprise a plurality of links 60, each having a cutting edge 61. Each link has interdigitating lug members 65, 66, 67, two on one side and one on the other, each with a central aperture 68 receiving a hinge pin 62, which is held by pin 63 and locks the links together so that they can pivot about the pin 62 and form an endless chain that can travel in a circular path. Because of the belt-like appearance, these debranching chains are represented in simplified belt form in FIGS. 1, 3, 4, 5 and 7, with the individual links and cutting edges indicated by lines.

A swinging cutting means 43 is provided on the beam 6, for making the cut necessary to fell the tree. A guide bar 45 carries an endless saw chain 44, and is mounted swingably at the outer extremity 6a of the beam 6 via pivot pin 45a. The bar 45 is swung between a first inactive position, in which it is stowed out of the way beneath the beam 6, and parallel thereto, and a second cutting position, in which it extends at an angle to the beam 6, and moves in the direction shown by the arrow. In this position, a stop mounted on the pivot pin 45a (not shown) prevents the bar from cutting all the way through the tree, at a point approximately 2 cm short of the gripping arm 46. The cutting means is adapted to cut the tree from the side of the felling head, when the felling head is in the cutting position, as shown in FIG. 4. The guide bar and saw chain are operated with drive means which are not shown, but which are known and form no part of the instant invention.

It will now be apparent that the tree, prior to felling and in the course of the cutting operation, can be held securely in the felling head because it is gripped on all sides at two levels, above and opposite the cutting means 43. On the side away from the felling head it is held on the upper level by the gripping claws 11 and 12, and opposite the felling cut by the gripping arm 46. On the side of the felling head, the tree is held on the upper level by the debranching chains 32, 33 and 42, and at the felling cut by the gripping plate 18 of the carriage 15.

Figure 2:
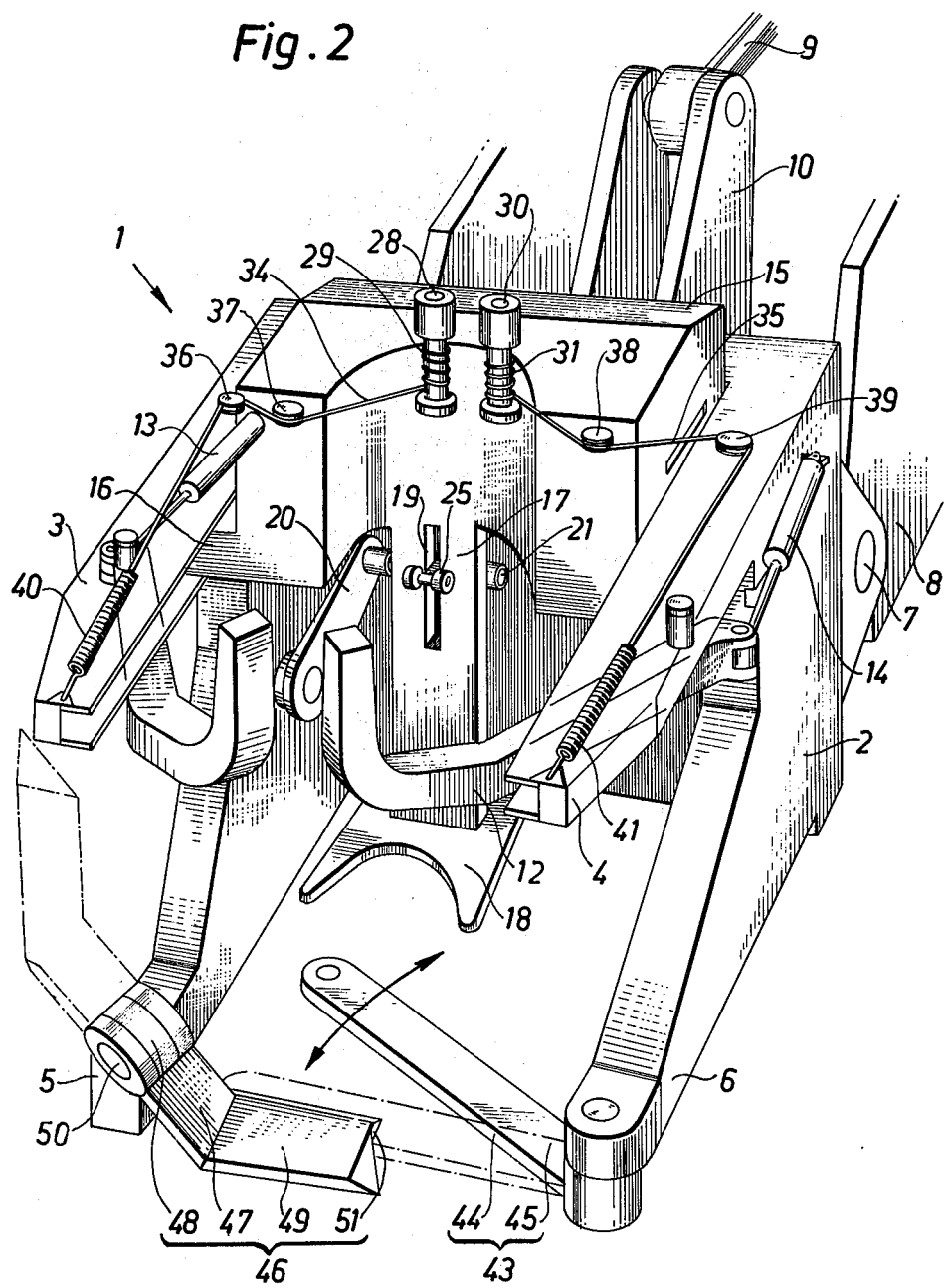
FIG. 2 is a further view similar to FIG. 1, but with certain parts either shown in dashed or faint or ghost lines, or omitted altogether, for clarity of representation.
Figure 8:
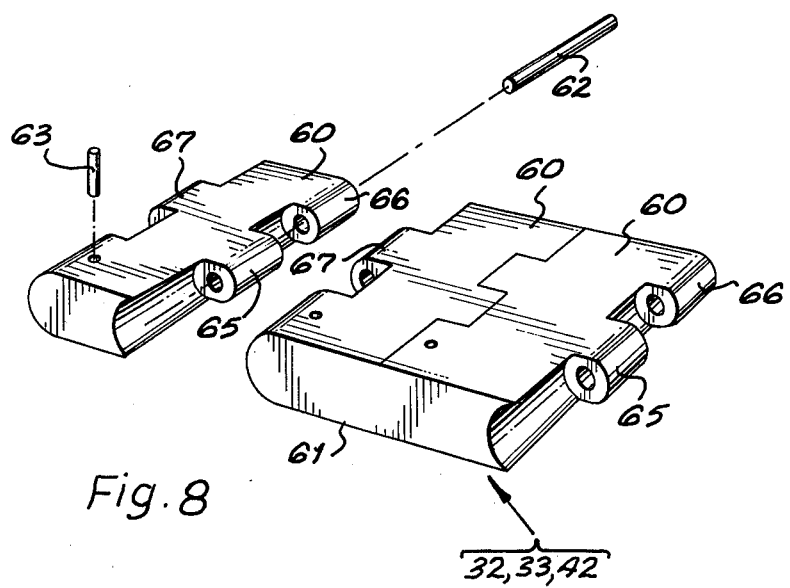
FIG. 8 is a detailed view of the debranching chains 32, 33, 42 of FIGS. 1, 3, 4, 5 and 7.

The gripping arm 46 is mounted at one end via boss 48 on pivot pin 50 at the outer extremity of the beam 5 so that it can be swung between an active position, shown in full lines in FIGS. 1 and 2, and an inactive position, shown in dashed lines in FIGS. 1 and 2. The pivot shaft 50 extends through the boss 48 at one end of the arm 46, and the bosses 5a, 5b attached to the end of beam 5. The arm has a flat portion 47, rectangular in cross-section, that extends from boss 48 to an outer portion 49 of triangular cross-section, set at an angle of approximately 135° to the portion 47, with a flange 51 at the lower edge extending towards the carriage 15. The flange increases the gripping action of the gripping arm 46 on the tree trunk. The pivot shaft 50 is inclined towards the point on the felling head where the upper beam 4 joins the base 2 of the frame, so as to enable the gripping arm 46 to clear the gripping claw 11, when this is swung outwardly, while the gripping arm 46 moves between active and inactive positions. In the active position of the gripping arm 46, the end portion of the arm 49 is located below the gripping plate 18, and its under edge is opposite the cutting means 43, one of the flat sides of the gripping arm 46 facing the cutting means.

In operation, for felling and debranching a tree, the vehicle carrying the crane jib 8 and the felling head 1 is maneuvered to the position shown in FIG. 3, so that the felling head engages the tree when the crane jib is extended. The jib is then extended, so as to place the felling head 1 against the tree, into the position shown in FIG. 4. This is done with the carriage 15 withdrawn, in the position shown in FIGS. 1 and 2, with the gripping claws 11, 12 fully open, the gripping arm 46 in its inactive position (shown in dashed lines in FIGS. 1 and 2),
and the cutting means 43 stowed beneath the beam 6, as seen in FIG. 3.

In order to grasp the tree on the side of the tree opposite the felling head, the gripping arm 46 is swung downwardly to its active position, seen in FIGS. 1 and 2, with the flange 51 engaging the tree. The carriage 15 is moved forwards by pivoting movement of the arm 20, until the tree is properly gripped on the felling head side, lower level, between the gripping arm 46 and the gripping plate 18 of the carriage. As the carriage is moved forward, the debranching chain 42 mounted on the carriage is also pressed against the tree trunk, on the felling head side.

Next, the gripping claws 11 and 12 are pivoted around the tree on the side opposite to the felling head, into the closed position seen in FIGS. 1 and 2, gripping the tree on the upper level from that side. The debranching chains 32, 33 mounted between the gripping claws 11, 12 and the spools 28, 30 are at the same time pressed against the exterior of the tree trunk on each side between the claws and the carriage, and chain 42 engages the tree trunk on the felling head side. The result is that the tree trunk is fully embraced on the upper level by the debranching chains 32, 33 and 42 and the gripping claws 11 and 12, and on the lower level by the gripping plate 18 and the gripping means 46, as seen in FIG. 4.

The tree is now ready to be cut, and the cutting means 43 for the tree is swung from its stowed position beneath the beam 6 so as to engage the side of the tree and begin cutting from the side, as seen in FIG. 4. Cutting is then begun. As the cutting continues, the cutting arm 45 swings towards the rear of the tree. When the trunk has been nearly sawed through, and the chain 44 of the cutting means is only approximately 2 cm from the gripping arm 46, located on the other side of the trunk, the cutting is halted, and the cutting means 43 is pivoted back to its inactive stowed position, beneath the beam 6. This can be done without risk that the saw chain will grab or jam in the cut, since most of the weight of the tree rests on the unsawed stub of trunk, and the tree is held in the upright position by the holding means 11, 12, 32, 33, 42 and 46.

Next, the tree is felled by breaking it off from the stub attached to the stump. This is done by the felling head. The hydraulic cylinder 9 is extended, so that the felling head 1 is pivoted about the pivot shaft 7 in the crane jib 8 from the horizontal position in FIG. 4 into the vertical position shown in FIG. 5. While this is being done, the gripping arm 46 is held pressed against the tree, immediately opposite the cut, against the unsawed stub of trunk, and thus the tree is felled against the gripping arm 46, operating as a fulcrum, and breaks off, thereby avoiding splitting of the trunk.

After the tree has been felled, with the felling head still in the vertical position shown in FIG. 5, the crane jib 8 is drawn back towards the vehicle, drawing the tree with it. At the same time, or shortly before, the gripping arm 46 is pivoted back to its inactive position. When crane jib 8 has reached its innermost position, the hydraulic cylinder driving the arm 20 (which moves the carriage) is exhausted, so that there is then no force except the weight of the carriage holding it in position, and the carriage rests via the debranching chain 42 and the gripping plate 18 on the tree trunk. The tree trunk in turn is held on the spring-tensioned debranching chains 32, 33.

The tree is then gripped at the free end by gripping means 52. The gripping means 52 has a pair of gripping claws 53, 54 pivotably mounted on shaft 55. The claw 53 is pivotably attached via shaft 55 to the carriage 56. Hydraulic cylinder 57 is pivotably attached via pin 57a at one end of shaft 55, with its piston 58 pivotably attached via pin 59 to claw 54. Thus, extension of piston 58 causes the claws 53, 54 to grasp the tree trunk. The carriage 56 has wheels 60 moving along the track 61 on the crane jib 8, and hence is reciprocably carried on the crane jib 8. Thus, the gripping means 52 is movable along the crane, as seen in FIG. 7.

The gripping means 52 is drawn in the direction shown by the arrow in FIG. 7, thereby drawing the tree through the debranching chains 32, 33, 42 at a speed equal to the sum of the speed at which the carriage 56 can be drawn along the jib, and the speed at which the jib 8 can be withdrawn, thereby debranching the tree. While this is being done, the carriage 15 and the debranching chain 42, which ride on the tree trunk, move downwardly as the trunk narrows towards the top end of the tree. In so doing, the debranching chains 32, 33 are wound up on the spools 28 and 30 of the carriage, as a result of the tension in the draw lines 34, 35.

After the tree has been fully debranched, the top end of the tree emerges from the felling head, and falls to the ground. The gripping means 52 is then released. The tree is now entirely free of the apparatus, and can lie at one side of the vehicle.

If the tree being debranched is extremely tall, i.e., long, longer than the crane jib 8 when fully extended, the tree can be debranched in stages. That part of the trunk which has been debranched can be severed by the cutting means 43 between the debranching stages, and placed on the ground. It is also possible to cut the top end of the tree from the trunk by the cutting means 43, if desired.

Many variations of the device will be perceived to be within the scope of the invention. For example, the debranching chains 32, 33 may be so drawn by the rollers 28, 30 as to extend at an angle thereto, and may be connected directly to the draw lines 34, 35, and/or to the springs 40, 41.

The apparatus can also be provided with mechanism which moves in parallel with the carriage, moving the carriage 15 along the beams 3, 4. For example, a parallelogram suspension can be mounted between the frame structure 2 and the member 17 of the carriage. In this case, the sides 16 and the drive arm 20 can be omitted.

It is also possible to operatively link the gripping claws 11 and 12 to the same hydraulic cylinder, for movement between open and closed positions.

The debranching means 42 attached to the carriage 15 can be a knife fixedly mounted on the carriage, instead of a debranching chain. The cutting edge of the knife can be straight or curved, and turned to face the direction of movement of the tree through the felling head during debranching. However, a chain is preferred, since it will follow the curvature of a tree trunk, regardless of its diameter.

To reduce the stresses applied to the felling head during tree-felling and tree-debranching, the carriage 15 can be pivotable relative to the frame 2 in a vertical plane, through the extension of the crane jib 8.

It is also possible to arrange the chain 42, or a knife substituted for it, in a resilient manner, and/or arrange the chain or knife so as to be displaceable in a direction away from the gripping claws 11, 12 sufficiently to permit the recess in the carriage 15 to form one of the two holding means.

Having regard to the foregoing diclosure, the following is claimed as inventive and patentable embodiments thereof:

1. An apparatus for cutting, felling, and debranching trees combining tree-holding, tree-cutting and tree-felling means with tree-debranching means in one felling head, comprising, in combination, a mobile crane; a felling head pivotably mounted on the mobile crane; the felling head comprising means for holding a tree, means for cutting and felling a tree, and means for debranching a tree; the felling head being pivotable between a first position in which the tree can be held by the holding means, and cut and felled by the cutting and felling means; and a second position in which the felled tree can be moved along its longitudinal axis past and debranched by the debranching means, and the debranching means comprises first debranching means, second debranching means and third debranching means and a support means movable reciprocably with respect to the felling head and carrying at least in part the first, second and third debranching means and a holding means, the holding means, debranching means and support means being coordinately and combinably movable with respect to each other, so as to embrace a tree therebetween.

2. An apparatus according to claim 1, in which the holding means comprises upper and lower holding elements, the upper holding element comprising a pair of pivotable gripping members, and the lower holding element comprising the reciprocable support means and a gripping member pivotably mounted on the felling head for swinging movement between tree-holding and inactive positions.

3. An apparatus according to claim 1, in which the first, second and third debranching means are resiliently mounted on the support.

4. An apparatus according to claim 1, in which the third debranching means also is an element of the holding means.

5. An apparatus for cutting, felling, and debranching trees combining tree-holding, tree-cutting and tree-felling means with tree-debranching means in one felling head, comprising, in combination, a mobile crane; a felling head pivotably mounted on the mobile crane; the felling head comprising a frame, a track on the frame, a carriage movable along the track towards and away from the tree trunk, a holding means carried on the carriage for holding a tree, means for cutting and felling a tree, and means for debranching a tree; the felling head being pivotable between a first position in which the tree can be held by the holding means and cut and felled by the cutting and felling means, and a second position in which the felled tree can be moved along its longitudinal axis past and debranched by the debranching means.

6. An apparatus according to claim 1, in which the support provides a recess for accommodating the trunk of a tree therewithin, the recess in combination with the holding means providing a space therebetween for accommodating and embracing a tree trunk that corresponds substantially with the diameter of the tree for a sure and firm grip on the tree.

7. An apparatus according to claim 1, in which at least one element of the holding means is adapted to abut with the portion of the trunk opposite the cut and in a position to break the fall of the tree as the tree stub breaks off from the stump, and thereby prevent splitting of the trunk during felling.

8. An apparatus according to claim 1, in which the debranching means comprises a plurality of debranching chains.

9. An apparatus according to claim 8, in which the debranching chains have attached thereto a plurality of cutters.

10. An apparatus for cutting, felling and debranching trees combining tree holding, tree cutting and tree felling means with tree debranching means in one felling head, comprising, in combination, a mobile crane, a felling head, pivotably mounted on the mobile crane, the felling head comprising means for holding a tree, means for cutting and felling a tree, and means for debranching a tree, the debranching means comprising first and second debranching chains and the holding means comprising a pair of gripping pincers, each debranching chain being resiliently attached to one pincer, and a carriage carrying the debranching chains towards and away from the tree; the pincers being movable towards and away from each other about the tree, and the branching chains and the pincers being movable with respect to each other to encircle the tree, the felling head being pivotable between a first position in which the tree can be held by the holding means and cut and felled by the cutting and felling means, and a second position in which the felled tree can be moved along its longitudinal axis and debranched by the debranching means.

11. An apparatus according to claim 10 in which a third debranching means is mounted on the carriage substantially transversely to the first and the second debranching chains.

12. An apparatus according to claim 10 in which the first and second debranching chains are each connected to one end to a roller biased in a direction to tension the chains during winding.

13. An apparatus according to claim 12, in which the first and second debranching chains are each connected to a tension spring attached to the felling head, and held in tension thereby.

14. An apparatus according to claim 1 in which the felling head is pivotably mounted on the crane in a manner to move between horizontal and vertical orientations with respect to the crane.

* * * * *

UNITED STATES PATENT AND TRADEMARK OFFICE
CERTIFICATE OF CORRECTION

PATENT NO. : 4,116,249
DATED : September 26, 1978
INVENTOR(S) : Lars Gunnar Hogberg et al.

It is certified that error appears in the above-identified patent and that said Letters Patent are hereby corrected as shown below:

Column 4, line 51, "A third debranching chain 42 carrying cutters --.

Column 10, line 13, claim 12, "to" first occurrence, should be -- at --.

Signed and Sealed this

Eleventh Day of September 1979

[SEAL]

Attest:

Attesting Officer

LUTRELLE F. PARKER
Acting Commissioner of Patents and Trademarks